United States Patent [19]

Huang

[11] Patent Number: 4,945,337
[45] Date of Patent: Jul. 31, 1990

[54] TIRE PRESSURE INDICATOR

[76] Inventor: Tien-Tsai Huang, No. 4, Lane 30, Wu-Chang St., Pan-Chiao City, Taiwan

[21] Appl. No.: 407,351

[22] Filed: Sep. 14, 1989

[51] Int. Cl.⁵ .............................................. B60C 23/00
[52] U.S. Cl. .................................... 340/442; 340/447; 73/146.5; 73/146.8; 116/34 R; 200/61.22; 137/233
[58] Field of Search ................. 340/442–445, 340/626, 691, 447; 73/146.2, 146.5, 146.8; 116/34 R, 34 A, 34 B; 200/61.22; 137/223, 224, 225, 233

[56] References Cited

U.S. PATENT DOCUMENTS

| | | | |
|---|---|---|---|
| 3,938,078 | 2/1976 | Davis et al. | 340/442 |
| 4,737,760 | 4/1988 | Huang et al. | 340/445 |
| 4,814,745 | 3/1989 | Wang | 340/442 |

*Primary Examiner*—Donnie L. Crosland
*Attorney, Agent, or Firm*—Seed and Berry

[57] ABSTRACT

A tire pressure indicator includes: a hollow cylindrical body with a closed side and an open side; a light bulb with a threaded negative portion and a positive contact detachably mounted at the closed side of the hollow cylindrical body; a transparent cover positioned at the closed side over the light bulb; a first conductor, together with a piston container, connected to the threaded negative portion of the light bulb; a sleeve member movably disposed around the piston container in the hollow cylindrical body; a piston unit composed of a mercury cell, a pressure spring and a sliding member movably disposed in the piston container; a pressure sensor which is a combination of a flexible film member, a second conductor and an air-channel member fixed on the closed side of the sleeve member under the piston unit; and a supporting base with an air chamber screw-connected to the open side of the hollow cylindrical body; whereby, when the air pressure indicator is connected to the tire valve of an associated tire, the tire pressure condition of the associated tire can be monitored and indicated via the light bulb without incurring any air pressure leakage of the associated tire.

4 Claims, 2 Drawing Sheets

TIRE PRESSURE INDICATOR

BACKGROUND OF THE INVENTION

This invention relates to a tire pressure indicator, and particularly to a kind of tire pressure indicator having a pressure sensor and a separate inflating pin arranged therein for monitoring and warning the user of a deficiency of pressure in an associated tire, as well as for preventing the air pressure in an associated tire from leaking out in case a malfunction of said indicator occurs thereat.

Conventionally, tire pressure is usually checked either by using a pressure gauge or by feeling the tire. The former method is normally done by specialists while the latter method is usually adopted by ordinary people, who press the tire with their hand or knock on the tire with a hammer or their foot. In order to provide an automatic tire pressure detecting arrangement, a tire pressure detector has been developed to meet the demand of ordinary people for accurate and reliable tire pressure measurement. Such a tire pressure detector is described in U.S. Pat. No. 4,726,223, issued to this applicant.

The main feature of the tire pressure detector, (presented with two embodiments), disclosed in said Patent Specification, resides in a hollow cylindrical case having an open end thereof screw-connected to the inflating valve of an associated tire with a pin which is inserted into the inflating valve so as to enable the pressure of said tire to pass through an air channel provided in said hollow cylindrical case and push upward a piston member movably located and remaining therein so that an axial rod, (in a first embodiment), extends out of the hollow cylindrical case or a light bulb, (in a second embodiment), which remains unlit thereat, indicating that the tire pressure is sufficient. If the tire pressure is insufficient, the piston member in the hollow cylindrical case will drop and the top of said axial rod (in the first embodiment) will be lowered down, or said light bulb (in the second embodiment) will be lit thereat, as a result of the contact made between said light bulb and the terminal of a battery disposed therein, serving as a warning indicator thereat. Although said tire pressure detector (in two embodiments) can function well under normal conditions, it suffers from a drawback as follows:

Since the piston member of said air pressure detector is positioned within said hollow cylindrical case and supported by a cap member screw-connected to the upper portion of said hollow cylindrical case, if said cap member is intentionally loosened or accidentally damaged, said piston member will become unattached therein while the open end of said hollow cylindrical case, together with the pin, remains secured on the inflating valve of said tire so that the air pressure in the tire will leak out through the air channel of said hollow cylindrical case, causing a considerable deficiency thereof.

SUMMARY OF THE INVENTION

It is accordingly a primary object of the present invention to provide a tire pressure indicator with a pressure sensor arrangement by which tire pressure can be effectively detected and indicated and by which, even if said indicator is damaged, no escape of the air pressure in the tire will occur.

This and other objects of the present invention are achieved by the provision of a tire pressure indicator which comprises: a hollow cylindrical body having a closed side at the upper end thereof and an open side at the lower end thereof; a light indicating mechanism, which comprises a light bulb, a first conductor member, and a light cover, disposed at the closed side of said hollow cylindrical body; a piston container with a closed side at the upper end thereof and an open side at the lower end thereof screw-connected to a threaded portion of said light bulb in said hollow cylindrical body; a sleeve member having a closed side at the lower end thereof and a piston unit, which includes a mercury cell, a pressure spring positioned under said mercury cell, and a sliding member located on the lower end of said pressure spring, separately disposed in the hollow cylindrical body and located around said piston container with said piston unit being movably positioned in the inner chamber of said piston container and controllable to be raised or lowered therein by the air pressure of an associated tire; a pressure sensor which is composed of a film member, a second conductor member and an air-channel member, disposed under said sliding member and positioned on the closed side of said sleeve member for being coupled with the tire valve of an associated tire and operated by the air pressure of said tire in connection with said piston unit; and a supporting base with an air cavity in the middle thereof connected to the open side of said hollow cylindrical body in conjunction with the air-channel member of said pressure sensor for being secured on the inflating valve of said tire along with said hollow cylindrical body; whereby, when said tire pressure indicator is connected to the air inflating valve of a tire, the pressure of a tire can be effectively detected and indicated therewith.

The present invention resides in the arrangement of the sleeve member and an inflating pin provided in said pressure sensor wherein said inflating pin is not directly attached to said hollow cylindrical body but is indirectly positioned in said sleeve member so that if said hollow cylindrical body is accidentally damaged or intentionally loosened by a vandal, said sleeve member will become unstable thereat and said inflating pin will be automatically disengaged with the tire valve of the associated tire so as to ensure that no air pressure can escape from the associated tire.

Other advantages and salient features of the present invention will become clear from the detailed description of a preferred embodiment when read in conjunction with the accompanying drawings.

DETAILED DESCRIPTION OF THE PREFERRED EMBODIMENT

Figure 1:
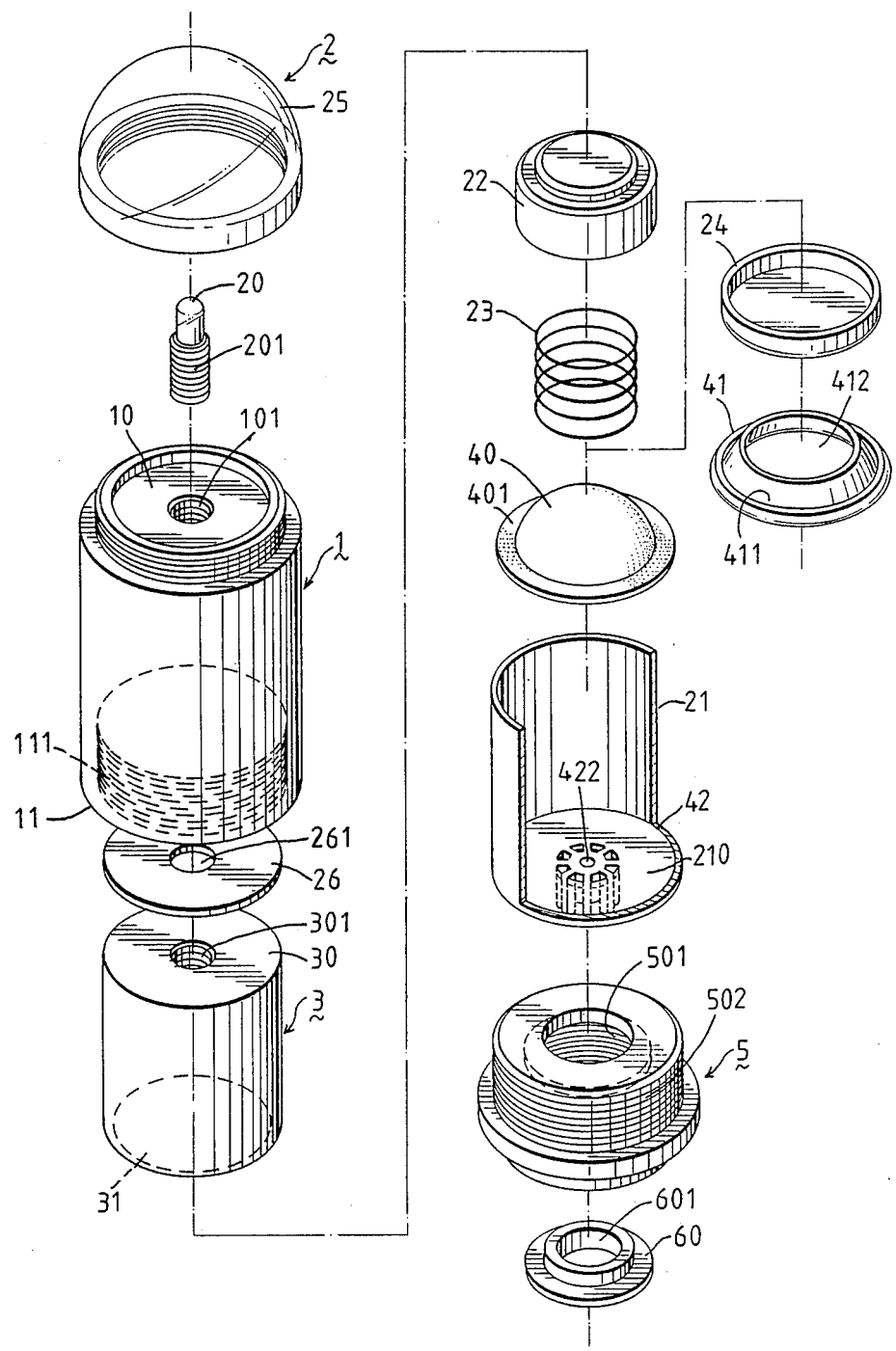
FIG. 1 is an exploded and perspective view of a preferred embodiment of a tire pressure indicator according to the invention.
Figure 2:
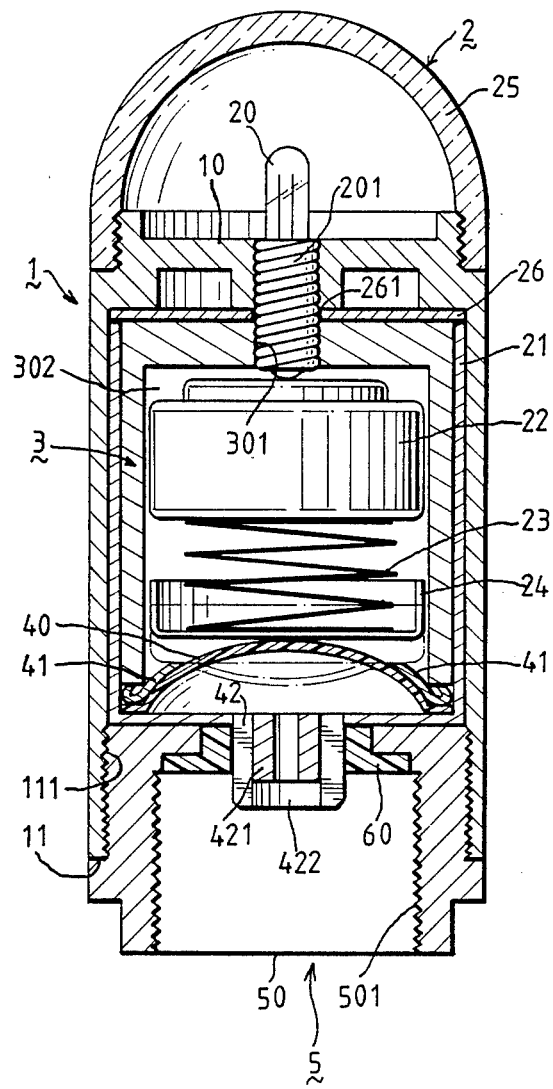
FIG. 2 is a sectional view of the assembled preferred embodiment shown in FIG. 1.

Referring to FIGS. 1 and 2, the preferred embodiment of a tire pressure indicator according to the present invention comprises a combination of a hollow cylindrical body 1, a light indicating mechanism 2, a piston container 3, a pressure sensor and a supporting base 5.

The hollow cylindrical body 1 includes a closed side 10 at the upper end thereof and an open side 11 at the lower end thereof wherein said closed side 10 has a threaded central opening 101 and said lower end 11 is provided with a threaded portion 111 on the inner wall thereof for being screw-connected with said supporting base 5.

The light indicating mechanism 2 includes: a light bulb 20 with a threaded negative portion 201 detachably mounted in the threaded central opening 101 of the closed side 10 of said hollow cylindrical body 1; a transparent light cover 25 screw-connected to the closed side 10 over said light bulb 20 at the upper end of said hollow cylindrical body 1; and a first conductor member 26 with a central opening 261 thereof disposed on the bottom surface of the closed side 10 of said hollow cylindrical body 1 with the threaded portion 201 of said light bulb 20 extending out of the central opening 261 of said first conductor member 26.

The piston container 3, which includes a threaded opening 301 provided in an upper closed side 30 thereof and a lower open side 31 thereof, is screw-connected to the threaded negative portion 201 of said light bulb 20 through said threaded opening 301 within said hollow cylindrical body 1. A sleeve member 21, having a closed side 210 at the lower end thereof and a piston unit located on said closed side 210, is separately sleeved around said piston container 3 and movably located against the inner wall of said hollow cylindrical body 1 wherein said piston unit, which comprises a mercury cell 22, a pressure spring 23 under said mercury cell 22 and a sliding member 24 located on the lower end of said pressure spring 23, is movably located in the inner chamber of said piston container 3, (as shown in FIG. 2), creating a biasing action therein in response to the air pressure inside an associated tire.

A pressure sensor comprises a film member 40, a second conductor member 41, and an air-channel member 42. The air-channel member 42, which is fixedly attached to the closed side 210 of said sleeve member 21, includes an inflating pin 421 extending downward from the closed side 210 of said sleeve member 21 with a plurality of air channels 422 formed therein in communication with the open space of said sleeve member 21 as well as with the inner chamber of said piston container 3. The second conductor member 41 which has an opening 412 in the middle portion thereof and a flat edge 411 formed around said opening 412, is positioned over said air-channel member 42 on the closed side 210 of said sleeve member 21. The film member 40, which is flexible in nature, has a flange 401 formed at the lower edge thereof and is coupled with said second conductor member 41 along the flat edge 411 thereof with the top end of said film member 40 being located under the bottom side of said sliding member 24 and the inflating pin 421 projecting downward therefrom. (It shall be appreciated that the negative electrical path is constituted by said pressure spring 23, said sliding member 24, said second conductor member 41, said sleeve member 21, said first conductor member 26 and the threaded portion 201 of said light bulb 20 in the preferred embodiment.)

The supporting base 5, having an air chamber 50 formed in the middle portion thereof, with internal threads 501 and external threads 502 being provided therearound, is screw-connected to the open side 11 of said hollow cylindrical body 1, and a seal 60 with an opening 601 formed in the middle thereof is engaged around said air-channel member 42 for preventing air from leaking out of the same thereby seriously reducing the pressure of the associated tire.

As shown in FIG. 2, operations of the assembled preferred embodiment are as follows:

When the air chamber 50 of said supporting base 5, together with the hollow cylindrical body 1, is screw-connected to the valve of an associated tire and positioned thereat with the inflating pin 421 being inserted into said valve, under normal conditions, the air pressure inside said tire will push the film member 40 upward against the sliding member 24 thus in turn moving said sliding member 24 upward to press the pressure spring 23 to compress itself. At this stage, although the positive end of said mercury cell 22 is in contact with the positive end of said light bulb 20, said light bulb 20 will not be lit because the negative part (the threaded negative portion 201) of said light bulb 20 is not electrically connected to the second conductor 41. If the air pressure of the associated tire is insufficient, said film member 40 will not be sufficiently supported by the tire pressure and thus will fall down, (as shown by the phantom line in FIG. 2), and the compressed pressure spring 23 will expand and push said sliding member 24 downward therefrom so as to contact said second conductor 41, electrically connecting the negative electrical path through said sleeve member 21 and said first conductor member 26 and lighting said light bulb 20, indicating that the air pressure in said tire is defective and needs to be checked and restored.

It should be noted that the sleeve member 21 is movably located in the hollow cylindrical body 1 and the inflating pin 421, together with said air-channel member 42, is fixedly attached to the closed side 210 of said sleeve member 21. Therefore, in case the hollow cylindrical body 1 is accidentally damaged or intentionally loosened by vandals, said sleeve member 21 will be destabilized and the support thereof will be lost. As a result, the air pressure of the related tire will push said inflating pin 421 out of the valve of the related tire preventing the escape of air pressure therefrom.

It shall be appreciated that although a particular embodiment of the present invention has been shown and described, modifications may be made thereto. It is therefore intended that the following claims cover all modifications which fall within the scope of the present invention.

What is claimed is:

1. A tire pressure indicator having a hollow cylindrical body formed with a closed side at one end thereof and an open side at another end thereof for being positioned on a tire valve of an associated tire with a light bulb being detachably mounted in a threaded central opening formed in the closed side of the hollow cylindrical body, comprising:
   a transparent light cover screw-connected to the closed side of the hollow cylindrical body over the light bulb thereof;
   a first conductor member having a central opening formed therein disposed on a bottom surface of the closed side of the hollow cylindrical body and engaged with a threaded negative portion of the light bulb through the central opening of said first conductor;
   a piston container with an upper closed side thereof and an lower open side thereof screw-connected to the threaded negative portion of the light bulb at said upper closed side in the hollow cylindrical body;
   a sleeve member with a closed side located at a lower end thereof movably disposed in the hollow cylindrical body with said piston container being sleevingly received therein;

a piston means movably disposed in an inner chamber of said piston container so as to be controlled by the tire pressure of an associated tire for turning the light bulb on and off in conjunction with the tire pressure condition of the associated tire;

a pressure sensing means fixedly provided on the closed side of said sleeve member under said piston means for being detachably connected to the tire valve of the associated tire to monitor and indicate the pressure condition of the associated tire; and a supporting base, having an air chamber formed therein with internal and external threads provided therearound, screw-connected to the open side of the hollow cylindrical body for being detachably connected to the tire valve of the associated tire; whereby, with said tire pressure indicator being detachably connected to an associated tire, the pressure condition of the associated tire can be monitored and indicated via the light bulb without incurring any air pressure leakage therefrom even when the hollow cylindrical body is damaged or loosened.

2. A tire pressure indicator according to claim 1 wherein said piston means comprises:

a mercury cell having a positive end being kept in contact with a positive end of the light bulb in the hollow cylindrical body;

a pressure spring member having an upper end positioned under a bottom side of said mercury cell for keeping said mercury cell in contact with the positive end of the light bulb thereat; and a sliding member placed under a lower end of said pressure spring member for being operated by the tire pressure of an associated tire to cause said pressure spring member to either be compressed or released thereat so as to turn the light bulb on or off therewith.

3. A tire pressure indicator according to claim 1 wherein said pressure sensing means comprises:

a flexible film member placed under a bottom side of said sliding member for being moved, by the tire pressure of an associated tire, against said sliding member;

a second conductor member, which is coupled with said flexible film member under a lower edge thereof, positioned on the closed side of said sleeve member for serving as an electrical negative terminal thereat through said sleeve member and said first conductor; and an air-channel member, having an inflating pin and a plurality of air channels provided therein, fixedly attached to a bottom surface of the closed end of said sleeve member with said air channels being in communication with said flexible film member; so that, when said inflating pin is inserted into the tire valve of an associated tire, the air pressure inside said tire will push said flexible film member upward through said air channels so as to move said piston means upward against said pressure spring member without turning on the light bulb thereat when the tire pressure of the associated tire is normal.

4. A tire pressure indicator according to claim 3 wherein said air-channel member further comprises a seal closely engaged around a periphery of said air-channel member and extending downward from the bottom surface of the closed side thereof so as to prevent air lose from an associated tire thereat when said air-channel member is detachably connected to the tire valve of the associated tire.

* * * * *